(No Model.) 2 Sheets—Sheet 1.
T. H. DODGE & C. G. WASHBURN.
PROCESS OF MANUFACTURING BARBED WIRE.
No. 252,746. Patented Jan. 24, 1882.
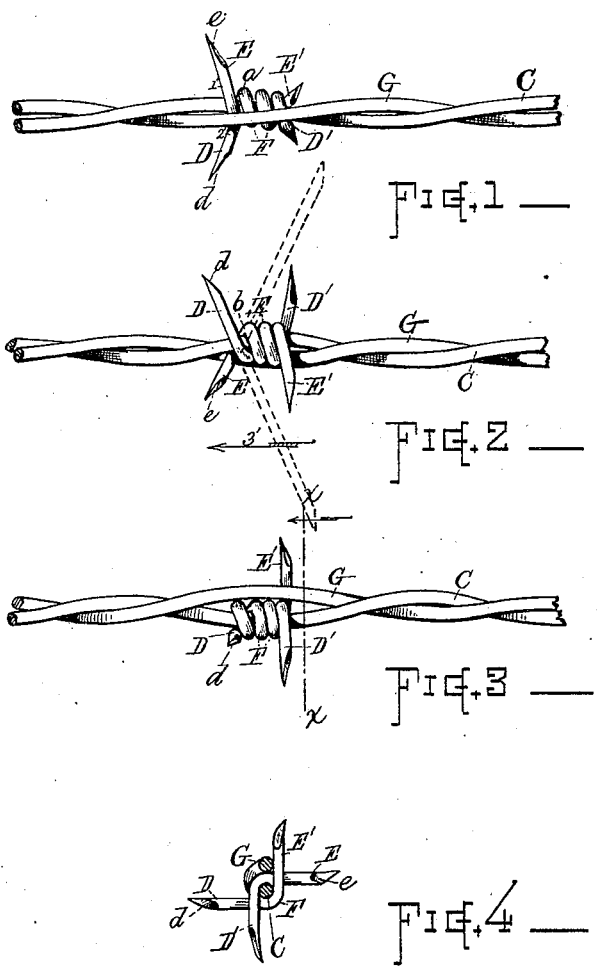
WITNESSES —
Edwin E. Moore.
John C. Dewey.
INVENTORS —
Thos. H. Dodge
Chas. G. Washburn

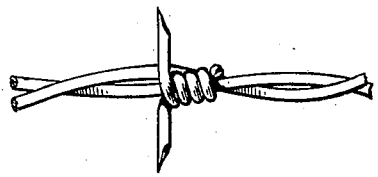
Fig. 3ª

UNITED STATES PATENT OFFICE.

THOMAS H. DODGE AND CHARLES G. WASHBURN, OF WORCESTER, MASS.

PROCESS OF MANUFACTURING BARBED WIRE.

SPECIFICATION forming part of Letters Patent No. 252,746, dated January 24, 1882.

Application filed November 21, 1881. (No model.)

*To all whom it may concern:*

Be it known that we, THOMAS H. DODGE and CHARLES G. WASHBURN, both of the city and county of Worcester, and Commonwealth of Massachusetts, have invented certain new and useful Improvements in the Process of Manufacturing Barbed Wire; and we do hereby declare that the following is a full, clear, and exact description of the same, reference being had to the accompanying drawings, forming a part of this specification, and in which—

Figure 1 represents a section or short piece of the barbed wire as it would appear if made by any of the modes of manufacture in use before our said invention. Fig. 2 represents an opposite view from that shown in Fig. 1. Fig. 3 represents a section or short piece of the wire as it appears when made according to our improved process. Fig. 3ª represents the central portion of the parts shown in Fig. 3 when turned a quarter way around, so as to bring the left-hand barbs into vertical positions, one pointing up and the other down, the same as the right-hand barbs, as shown in Fig. 3; and Fig. 4 represents a cross-section on line x x, Fig. 3, looking in the direction of the arrow, same figure.

To enable those skilled in the art to which our invention belongs to make and use the same, we will proceed to describe the same more in detail.

In the drawings, the main wire C has coiled thereon two barb-wires, D and E, and these barb-wires are fed to the machine by automatic machinery, and are cut off at the points d and e after the ends D' and E' have been coiled upon the wire C. The end D' of our barb-wire is run upon one side of wire C, while the end E' of the other barb-wire is run upon the other side of the main wire C, and these ends are run past the main wire C a sufficient distance to form the double coil F, each barb-wire making two turns about the wire C, and its ends left projecting to form barbs, as indicated in the drawings.

Prior to our invention attempts had been made to manufacture a cabled four-pointed barbed wire with the barbs upon only one wire; but resort was had to rather complicated arrangements, such as twisting one barb-wire around its fellow the whole or a part of the distance in order to secure a tight lock, and which constructions were objectionable as presenting projections and enlargements in the coils, and also preventing the plain or unbarbed wire G from being cabled or twisted with the barbed wire C, so as to be compact, close, even, and uniform, and thereby presenting such a construction as to secure a uniform strain and tension on both main wires. By our process the barb-wire ends D' and E' are wound on the wire C, and their ends left standing out at right angles, as shown in Fig. 4, while the other ends, D and E, which stand oblique, as shown in Figs. 1 and 2, when cut off, are struck with a sudden and quick blow at the points 1 and 2, thereby forcing the end E up against the coil $a$ of the barb-wire D and the end D up against the coil $b$ of the barb-wire E, which securely locks the coils together, and at the same time straightens out the ends D and E, so that they will stand out at right angles to the wire C, the same as the ends D' and E, as in Fig. 3. Wire G is cabled with the barbed wire C, so that it will rest against the barb ends E', and also press on the bases of the barb ends D' and E', by which arrangement both barb-coils are still further secured in position.

It will be understood that by the action of setting back the ends D and E the pitch of the coils or screws formed thereby is changed from what it is in the middle of the coils or screws, and hence the whole coil is rendered rigid as if set-nuts were used.

The barb-wire thus manufactured allows an expansion and contraction of each main wire comparatively independent of its fellow, while the coils of the barb-wires are such that both main wires can be closely cabled together, and so evenly as to make both main wires of about the same length, and hence both take and resist any strain brought to bear upon any given cabled strand when in use, thereby obviating the objection to interlocking and winding the barbs about both main wires. Then, again, the barbs being made to stand out straight obviates the objections to oblique barbs, the latter being more liable to injure stock. The blow is struck against ends D and E while the wire is moving forward with the barbs thereon in the direction indicated by arrow 3', Fig. 2. Of course said quick spring-blow can be struck when the wire is at rest, and hence the invention is applicable to machines in which the wire to be barbed is fed forward intermittingly or at stated intervals. The positions of the barb-wires, after they have been run forward from the spool of wire preparatory to being coiled about the main strand C to form the double coil F, are shown in dotted lines, Fig. 2. Wire C passes through a rotating and coiling head, which has upon its front end two coiling-pins projecting forward, one pin for each barb-wire, and by the rotation of said head and pins the barb-wires are coiled about the wire C to form the coil F, after which the barb-wire is cut at the points $d$ and $e$, when the wire and its attached group of barbs pass on, and the operation is repeated. We prefer to have the main wire fed forward by a continuous motion, the coiling-head having a reciprocating motion, so that the barbs can be coiled on wire C when it is moving forward with the same, or nearly the same, speed as the main wire C, the head-face being arranged to force and straighten up the ends D' and E' at end of the coil. The barb ends are not "set" and do not remain up close to the coils $a$ and $b$ when pushed back by gradual pressure, as when struck back by a quick and sudden blow at the points 1' and 2', as above described.

Having described our invention, what we claim therein as new, and desire to secure by Letters Patent, is—

1. The improved process of manufacturing four-pointed barbed wire, consisting in, first, running the ends of two barb-wires diagonally across the wire to be barbed, one on each side thereof; second, coiling said ends into a double coil, F, with the ends D' and E' left projecting in opposite directions; and, third, setting back the last-cut ends D and E of the barb-wires against the coils $a$ and $b$ by a sudden and quick blow, and straightening out the ends at right angles, or nearly so, to the main wire, for the purposes set forth.

2. In the process of manufacturing four-pointed barbed wires, straightening the barb ends, and setting them back to lock their respective coils by a quick and sudden blow, substantially as described.

3. A four-point barb for wire-fencing, consisting of two wires spirally coiled with the coils approximately parallel throughout, but having a portion of the last coils at one or both ends slightly bent, as explained, so as to lock the two barb-wires together, substantially as described.

THOS. H. DODGE.
CHARLES G. WASHBURN.

Witnesses:
EDWIN E. MOORE,
JOHN C. DEWEY.